Oct. 16, 1962  IYETSUNE TSUBOKAWA  3,058,396
MECHANISM FOR THE MOUNTING OF A COMPENSATOR
MIRROR IN A SELF-LEVELING INSTRUMENT
Filed July 29, 1959  2 Sheets-Sheet 1

INVENTOR.
IYETSUNE TSUBOKAWA.

Oct. 16, 1962  IYETSUNE TSUBOKAWA  3,058,396
MECHANISM FOR THE MOUNTING OF A COMPENSATOR
MIRROR IN A SELF-LEVELING INSTRUMENT
Filed July 29, 1959  2 Sheets-Sheet 2

INVENTOR.
IYETSUNE TSUBOKAWA.

United States Patent Office 3,058,396
Patented Oct. 16, 1962

3,058,396
MECHANISM FOR THE MOUNTING OF A COMPENSATOR MIRROR IN A SELF-LEVELING INSTRUMENT
Iyetsune Tsubokawa, Kanyuchi, 7-chome, Yatsu, Narashino-shi, Chiba-ken, Japan
Filed July 29, 1959, Ser. No. 830,248
Claims priority, application Japan Nov. 10, 1958
11 Claims. (Cl. 88—97)

This invention relates to optical instruments, and more particularly to novel means for mounting a compensator mirror in a self-leveling instrument, such as a telescope.

The apparatus embodying this invention comprises an improvement in the mounting means for the mirror shown and described in my copending patent application Serial No. 674,420, filed July 26, 1957.

In such copending application, there is shown a telescope provided with means which enables the collimation line of the telescope to be held horizontal automatically by locating a cross wire in the image space of the objective of the telescope at a point corresponding to the nodal point thereof and reflecting a ray in the image space by a mirror suspended in the gravitational field.

The tilt of a telescope of a levelling instrument is composed of two small rotations, that is, a rotation around the telescope axis and a rotation around a horizontal axis which is perpendicular to the telescope axis. The former rotation is corrected by hand by means of a bubble level fixed to the telescope tube in general levelling instruments whereas in automatic levelling instruments it is corrected by means of a compensating mechanism arranged in the telescope tube.

According to my co-pending patent application Serial No. 674,420, automatic levelling conditions are satisfied by a compensating mirror suspended by a thread or the like within the telescope so that the mirror is always kept in vertical position under the influence of gravity in spite of any rotation of the telescopic tube around a horizontal line perpendicular to the telescope axis.

In a self-leveling instrument of this type which is provided with the aforementioned means, oscillation of said mirror, which is suspended by threads, causes the field of vision of the instrument to shake and, therefore, measurement difficulties arise.

In order to improve the observation accuracy, a sufficient damping action must be given to the suspended element, or mirror system, which element includes the compensating mirror. In such cases the damping action is usually effected by interaction between damping members fixedly secured to the telescope tube and damping members secured to the suspended element. But, in order to increase the damping action, it is known that the clearances between both damping members must be very small, yet contact between the coacting parts must always be avoided when the telescope is tilted. In a self-levelling instrument which is intended to accurately level itself when the telescope is set up roughly horizontally, it is difficult to maintain this out of contact orientation of both the damping members, when the telescope may tilt in any direction, including tilt by effective rotation about its central axis.

One of the objects of the present invention is to avoid the above-mentioned disadvantages or to reduce same to a negligible proportion.

The invention in one aspect thereof embodies appropriate damping devices which are arranged on the supporting frame of such mirror. Such appropriate damping devices can comprise air damping means or magnetic damping means. Such damping means include relatively fixed parts which, for example, are rigidly mounted upon the telescope and relatively mobile parts which are rigidly mounted upon the mirror, the latter in turn, being suspended by two threads, extensions of which intersect one another at the center of gravity of such mirror system. The clearance between such relatively fixed and mobile parts is small in order to accomplish a sufficient damping action. This small clearance is required to remain practically unchanged in response to a small angular shift of the mirror about the axis of the telescope. Thus in summary the novel apparatus comprises a compensator mirror which is suspended by two threads, extensions of which intersect each other at the center of gravity of the mirror system and the mirror is prevented from oscillating by damping means such as air dampers or magnetic dampers.

The above and further objects and novel features will more clearly appear from the description given below taken in connection with the accompanying drawings which are for purposes of illustration only and are not intended to define the limits of the invention, reference for this latter purpose being had to the appended claims.

Figure 6:
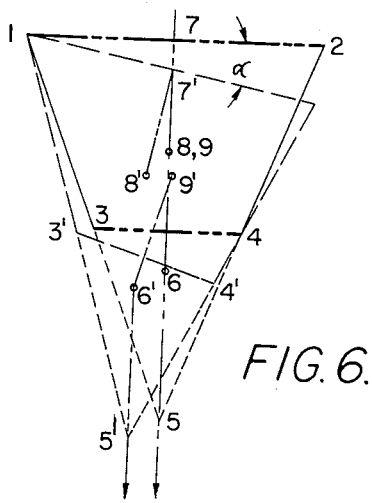
Figure 7:
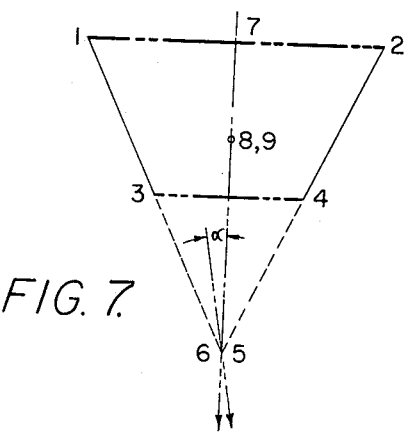

FIG. 6 is a schematic explanatory sketch, in which the relative orientation, in the plane of suspension of a suspended element, of coacting damping members would be changed due to a small rotation of the telescope around its central axis in a hypothetical case where the imaginary lines of extension of two suspending threads do not initially pass through the center of gravity of the suspended element; and FIG. 7 is a similar schematic explanatory sketch in which the relative orientation remains unchanged in response to a small rotation of the telescope around its axis, when said extensions intersect each other at the center of gravity.

Referring to the drawings, a compensator mirror M (FIG. 1) is suspended by two threads $T_1$, $T_2$ which at their upper extremities, as viewed in this figure, are connected to supporting elements $B_1$ and $B_2$, respectively, their lower extremities being connected to attachment members $A_1$ and $A_2$, respectively. The supporting elements $B_1$, $B_2$ are rigidly attached to a telescope tube or to a suitable mounting means E (FIGS. 2 and 3) which in turn is rigidly secured to a telescope tube. Said attachment members $A_1$ and $A_2$ are fixed to a supporting frame M' in which is mounted the mirror M. The mirror, together with its supporting elements, constitutes a "mirror system" as used herein, and it will be understood, particularly by reference to the aforementioned copending application which is incorporated by reference herein, that although the mirror M itself may be arranged either vertically or horizontally, the mirror system as a whole amounts to a suspended element of any device in which it may be incorporated. The mirror system, or suspended element is generally indicated in the drawings by the reference character G.

Figure 3:
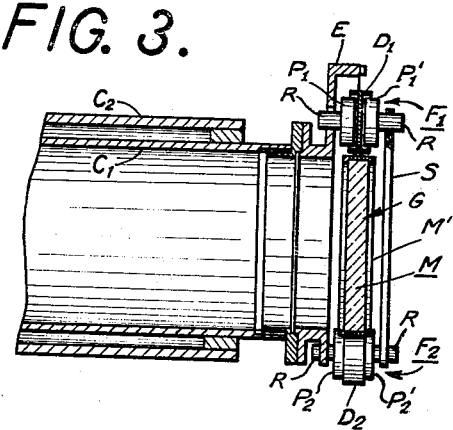
FIG. 3 is a side view, partly in section and with parts broken away, of apparatus embodying the invention mounted on the inner focusing tube of a telescope.

The air dampers are described as follows: In addition to the attachment members $A_1$ and $A_2$, three cylinders $D_1$, $D_2$ and $D_3$ (of air dampers $F_1$, $F_2$ and $F_3$) are rigidly fixed to such supporting frame M'. A pair of coaxial pistons, $P_1$, $P_1'$, coacts with the cylinder $D_1$ by extending into the opposite shallow coaxial bores thereof, as shown in FIG. 3, such bores being separated by a flat wall $D_1'$. Analogous pairs ($P_2$, $P_2'$ and $P_3$, $P_3'$) of pistons coact similarly with cylinders $D_2$ and $D_3$.

In the form shown, lines $T_1'$ and $T_2'$, comprising extensions of the threads $T_1$ and $T_2$ intersect each other at the center of gravity G of the mirror system. The clearances between pistons $P_1$, $P_1'$; $P_2$, $P_2'$; and $P_3$, $P_3'$ and the inner cylindrical and plane walls of their respective air damper cylinders remain practically unchanged. This results in an effective damping action, even when there occurs a small angular shifting of the mirror system about the axis H of the telescope. By means of the three dampers, as shown in the drawings, oscillation of the mirror system in all directions may be prevented.

In order to obtain an automatic leveling of a telescope, the mirror system will be arranged in the manner above mentioned, as shown in FIG. 3, on an inner telescope tube $C_1$ provided with a fine adjusting device which enables such tube $C_1$ to move relative to an outer telescope tube $C_2$.

Figures 1, 2:
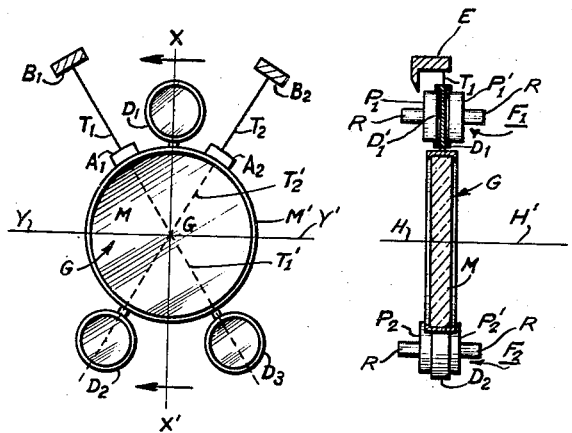
FIG. 1 is a front elevation of a mechanism embodying the present invention.
FIG. 2 is a vertical sectional view taken substantially along line X—X' of FIG. 1.

As in further shown in FIG. 3, there are employed piston rods R for each of the aforementioned pistons $P_1$, $P_1'$, etc. and these piston rods are fixedly mounted and hence they and their pistons comprise the relatively fixed portions of the damper as opposed to the relatively mobile cylinders $D_1$, $D_2$ and $D_3$. Thus the pistons to the left of the air cylinders, as viewed in FIGS. 2 and 3, are secured to element E, and the pistons to the right of the air cylinders are rigidly mounted upon a scarf ring S which in turn is connected to the part E or some other suitable relatively fixed element.

Referring now to FIG. 6, in which the drawing paper may be considered to lie in the plane formed by two suspending threads whose ends are indicated by numerals 1—3 and 2—4, respectively, the numerals 1 and 2 represent the suspending points of the threads as attached at the telescope tube, and numerals 3 and 4 the supporting points of said threads as attached at the suspended element. The threads 1—3 and 2—4, of course, are comparable to the threads $T_1$ and $T_2$ in FIGURE 1, for example. In FIG. 6, the numeral 5 denotes the intersecting point of imaginary extensions of the two threads 1—3 and 2—4, and the numeral 6 denotes the center of gravity of the suspended element which, it will be noted, by hypothesis, will not correspond to the location of numeral 5. In this case, an imaginary vertical line which passes through the center of gravity 6 must pass through the intersection 5 in order to maintain a static equilibrium of the suspended element in the gravitational field. In addition it is supposed, for the sake of simplification of the description, that the length of the threads 1—3 and 2—4 are identical, and that a line which would link the supporting points 1 and 2 with each other is horizontal, the supporting points 3 and 4 being symmetrical with regard to a vertical line which passes through the median point 7 of said horizontal line 1—2 and on which the intersection 5 and the center of gravity 6 are positioned and, further, that the center 8 of one of the damping members rigidly secured to the telescope tube (such as cylinder D' for example) and the center 9 of the corresponding damping member rigidly secured to the suspended element (such as a piston $P_1$ or $P_1'$) coincide with each other and are also located on said vertical line which passes through the median point 7. If it be supposed that the above-mentioned arrangement be tilted in the plane of the paper around the point 1 through a small angle $\alpha$, this situation will correspond to an inclination of the automatic compensating mechanism when the telescope tube is tilted around its axis through an angle $\alpha$. The positions of each point after said tilting are indicated by corresponding primed (') numerals, and that of each line in dash lines. The arrangement shown after said tilting can be demonstrated by statics of a rigid body. In the new position in which the arrangement would be in equilibrium, the lengths of the lines 1—2, 3—4, 1—3, and 2—4 must remain unchanged and the new intersection 5' of the extensions of the threads 1—3' and 2'—4' must be located on the vertical line passing through the center of gravity 6', it being assumed, in this case, that no elastic and no frictional action are effective at the supporting points 1, 2, 3 and 4.

As indicated in FIG. 6, relative positions between the points 1, 2 and 8 fixedly attached to the telescope tube and the points 3, 4 and 9 rigidly secured to the suspended element are changed by said rotation around the axis perpendicular to the drawing paper; that is, by the tilt of the telescope tube around its axis when the extensions of the threads 1—3 and 2—4 do not pass through the center of gravity. Therefore, with the air dampers having cylinders and pistons shown in FIGS. 1–3, or the magnetic dampers shown in FIGS. 4 and 5, which have small clearances between the fixed and the mobile damping members, these damping members would come into contact with each other when the telescope tube tilts around its axis, which would result in an obstruction in the action of the compensating mechanism.

By contrast, in FIG. 7 the intersection 5 of the extensions of the two threads 1—3 and 2—4 coincides with the center of gravity 6 of the suspended element in accordance witht he invention. In this case, the tilt $\alpha$ of the line 1—2 corresponds to that of the point 6 with regard to the gravitational direction. As indicated by analysis according to the aforementioned laws of statics, and as indicated in FIG. 7, the shape of the trapezoid 1—2—4—3 and the relative positions of the points 1, 2, 3, 4, 5, 6, 7 and 8 are unchangeable. Thus, in addition to the damping action promoted in axial direction by the provision of an extremely shallow air cushion chamber at the ends of the piston elements, the arrangement of the thread means in the present invention avoids contact of the damping elements when the telescope is tilted by rotation about its central axis. The combination means provided avoids the above-mentioned disadvantages of prior devices, and an effective and accurate compensating mechanism can be attained.

Figure 4:
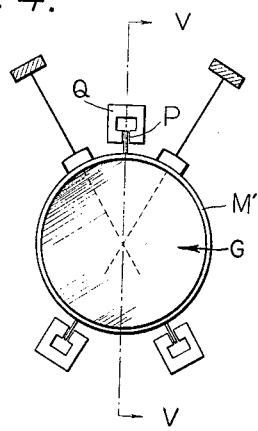
FIG. 4 is a front elevation of another embodiment of the present invention in which three magnetic dampers are used instead of the three air dampers.
Figure 5:
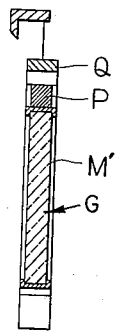
FIG. 5 is a vertical sectional view taken substantially along line V—V of FIG. 4.

Instead of the aforementioned air dampers three magnetic dampers can be used, as shown in FIGS. 4 and 5. Referring to FIGS. 4 and 5, a compensator mirror frame M' is provided with copper elements P or good conductors of electricity and non-magnetic substance at that, which are so arranged that they can be movable perpendicular to the direction of the magnetic field between both magnetic poles of the magnet Q which is rigidly attached to the telescope by means of a support. The perpendicular motion of said copper element P to the direction of the magnetic field is damped by the interaction between the magnetic field and Foucault current which is generated in said copper element, which results in a decrement of the oscillation of the compensator mirror system.

While the compensating mechanism having a mirror arranged vertically is mentioned above, the present invention can be applied to a compensating mechanism having a mirror arranged horizontally, as mentioned in the application Serial No. 674,420. In addition, this invention is applicable to instruments, in which a suspended element is supported by two threads or a similar method, and it is necessary to damp oscillation around an axis connecting the supporting points of the suspended element, whether or not a mirror be included in the suspended element.

While the invention has been described in detail with respect to certain preferred embodiments, it will be understood by those skilled in the art that various changes and modifications may be made without departing from the spirit and scope of the invention, and it is intended to cover all such changes and modifications in the appended claims.

I claim:

1. In apparatus having a relatively fixed body portion and a mirror element mounted in suspension with respect to said body portion: mounting means of said mirror element comprising two threads each attached to said body portion and to said element for providing said suspension of the latter, each of said threads being attached such that an extension of said threads intersects at the center of gravity of said element, and damping means for damping oscillations of said element which would otherwise occur in response to oscillations of said body portion, said damping means including means of said element and means attached to said body portion arranged in coacting relationship to each other and having small operating clearances at all points therebetween.

2. In apparatus having a relatively fixed body portion and a mirror element mounted in suspension with respect to said body portion: mounting means of said mirror element comprising two threads each attached to said body portion and to said element for providing said suspension of the latter, each of said threads being attached such that an extension of said threads intersects at the center of gravity of said element, and damping means for damping oscillations of said element which would otherwise occur in response to oscillations of said body portion, said damping means comprising coacting piston and cylinder means attached between said body portion and said element.

3. Apparatus according to claim 2, wherein said coacting piston and cylinder means consists of a plurality of cylinders spaced apart and attached to the periphery of said element, and a plurality of pistons operably engaging said cylinders, said pistons mounted in fixed relationship with respect to said body portion.

4. Apparatus according to claim 2, wherein said coacting piston and cylinder means consists of a plurality thereof spaced apart and arranged symmetrically with respect to an imaginary vertical line through the center of gravity of said element.

5. Apparatus according to claim 2, wherein said coacting piston and cylinder means consists of three cylinders arranged generally within and having their central axes perpendicular to the plane of said two threads and attached, in annularly spaced apart relation, to the periphery of said element, a first of said cylinders being located towards one end of said element so that an extension of one of said threads passes through said first cylinder, a second of said cylinders being located towards said one end of said element such that an extension of the other of said threads passes through said second cylinder, and the third of said cylinders being located towards the opposite end of said element and equally spaced from said first and second cylinders, and a pair of opposed pistons operably engaging each of said cylinders, all of said pistons mounted in fixed relationship with respect to said body portion.

6. In apparatus having a relatively fixed body portion and a mirror element mounted in suspension with respect to said body portion: mounting means of said mirror element comprising two threads each attached to said body portion and to said element for providing said suspension of the latter, each of said threads being attached such that an extension of said threads intersects at the center of gravity of said element, and damping means for damping oscillations of said element which would otherwise occur in response to oscillations of said body portion, said damping means comprising coacting electrically conductive non-magnetic means and magnet means attached between said body portion and said element.

7. Apparatus according to claim 6, wherein said coacting electrically conductive non-magnetic means consists of a plurality of electrically conductive non-magnetic protrusions spaced apart and attached to the periphery of said element, and a corresponding plurality of magnets each operably engaging said protrusions, said magnets mounted in fixed relationship with respect to said body portion.

8. Apparatus according to claim 6, wherein said coacting electrically conductive non-magnetic means and magnet means consists of a plurality thereof space apart and arranged symmetrically with respect to an imaginary vertical line through the center of gravity of said element.

9. Apparatus according to claim 6, wherein said coacting electrically conductive non-magnetic means and magnet means consists of three electrically conductive non-magnetic elements attached, in annularly spaced apart relation, to the periphery of said element, a first of said non-magnetic elements being located towards one end of said suspended element so that an extension of one of said threads passes through said first non-magnetic element, a second of said non-magnetic elements being located towards said one end of said suspended element, and the third of said non-magnetic elements being located towards the opposite end of said suspended element and equally spaced from said first and second non-magnetic elements, and a magnet associated with each of said non-magnetic elements, each said magnet providing a magnetic field passing through its associated non-magnetic element and mounted in fixed relationship with respect to said body portion.

10. In a self-levelling instrument having a relatively fixed body portion and a mirror element mounted in suspension with respect to said body portion, mounting means for said mirror element comprising: two threads each attached to said body portion and to said mirror element for providing gravitational suspension of the latter, said threads forming two vertically angulated lines, the extensions of which pass through the center of gravity of said mirror element, and damping means for damping oscillations of said mirror element which would otherwise occur in response to oscillations of said body portion, said damping means including a plurality of spaced apart, double-ended cylinders generally within and having their central axes perpendicular to the plane of said two threads, said cylinders attached to peripheral portions of said mirror element and symmetrically arranged with respect to a vertical line through said center of gravity of said mirror element, each said cylinder having an interiorly located flat wall separating the cylinder double ends, and a corresponding plurality of piston pairs each operably engaging one of said cylinders, each piston in the pair positioned within the respective ends of the cylinder with which the pair is associated and arranged and constructed with respect to said cylinder to provide small operating clearance, said piston pairs each mounted in fixed relationship with respect to said body portion.

11. In a self-levelling instrument having a relatively fixed body portion and a mirror element mounted in suspension with respect to said body portion, mounting means for said mirror element comprising: two threads each attached to said body portion and to said mirror element for providing gravitational suspension of the latter, said threads forming two vertically angulated lines, the extensions of which pass through the center of gravity of said mirror element, and damping means for damping oscillations of said mirror element which would otherwise occur in response to oscillations of said body portion, said damping means including a plurality of spaced apart, electrically conductive non-magnetic elements attached, generally within the plane of said two threads, to peripheral portions of said mirror element and symmetrically arranged with respect to a vertical line through said center of gravity of said mirror element, and a corresponding plurality of generally U-shaped magnets each operably associated with and arranged and constructed with respect to one of said non-magnetic elements such that the non-magnetic element resides between the legs of said U-shape with small operating clearance between the non-magnetic element and each said leg of the U-shape, said magnets each mounted in fixed relationship with respect to said body portion.

References Cited in the file of this patent

UNITED STATES PATENTS

| | | |
|---|---|---|
| 1,912,358 | Bush | June 6, 1933 |
| 2,590,184 | Koulomzine | Mar. 25, 1952 |

FOREIGN PATENTS

| | | |
|---|---|---|
| 29,462 | Great Britain | of 1910 |